United States Patent [19]
Cruces

[11] Patent Number: 5,104,038
[45] Date of Patent: Apr. 14, 1992

[54] THERMOSTAT APPARATUS

[76] Inventor: Pete Cruces, 704 Maple Ave., Montebello, Calif. 90640

[21] Appl. No.: 622,528

[22] Filed: Dec. 5, 1990

[51] Int. Cl.$^5$ .................................................. G05D 23/02
[52] U.S. Cl. .................................. 236/93 R; 137/220; 236/101 D
[58] Field of Search .................. 236/93 R, 101 D; 137/220

[56] References Cited

U.S. PATENT DOCUMENTS

| | | | |
|---|---|---|---|
| 3,340,899 | 9/1967 | Welty et al. | 236/93 R X |
| 3,366,333 | 1/1968 | Diehl | 236/93 R |
| 4,227,646 | 10/1980 | Hart et al. | 236/101 D X |
| 4,778,104 | 10/1988 | Fisher | 236/101 D X |
| 4,848,653 | 7/1989 | Van Beceldare | 236/101 D X |

Primary Examiner—William E. Tapolcai
Attorney, Agent, or Firm—Leon Gilden

[57] ABSTRACT

An apparatus wherein a thermostat is mounted within a sleeve, with the sleeve positionable as a junction between a plurality of hoses, or alternatively, the sleeve formed with a sealing boss, with the sealing boss extending radially beyond the sleeve, and including an "O" ring to effect sealing of the organization within a single unitary fluid conducting hose.

6 Claims, 5 Drawing Sheets

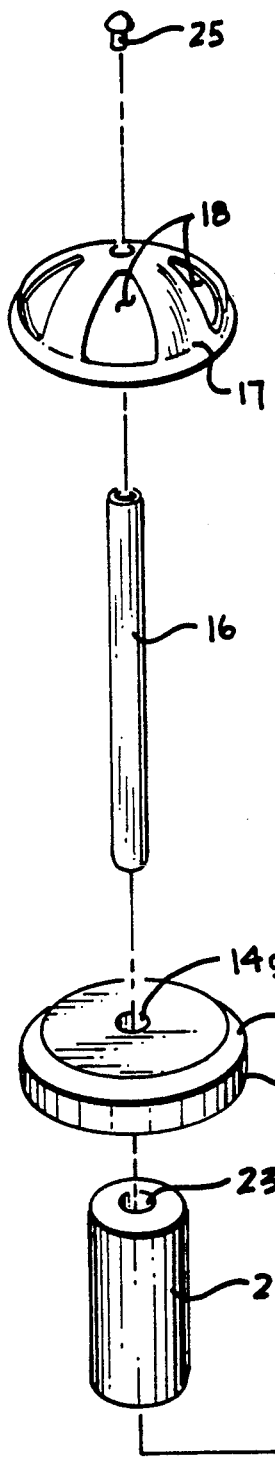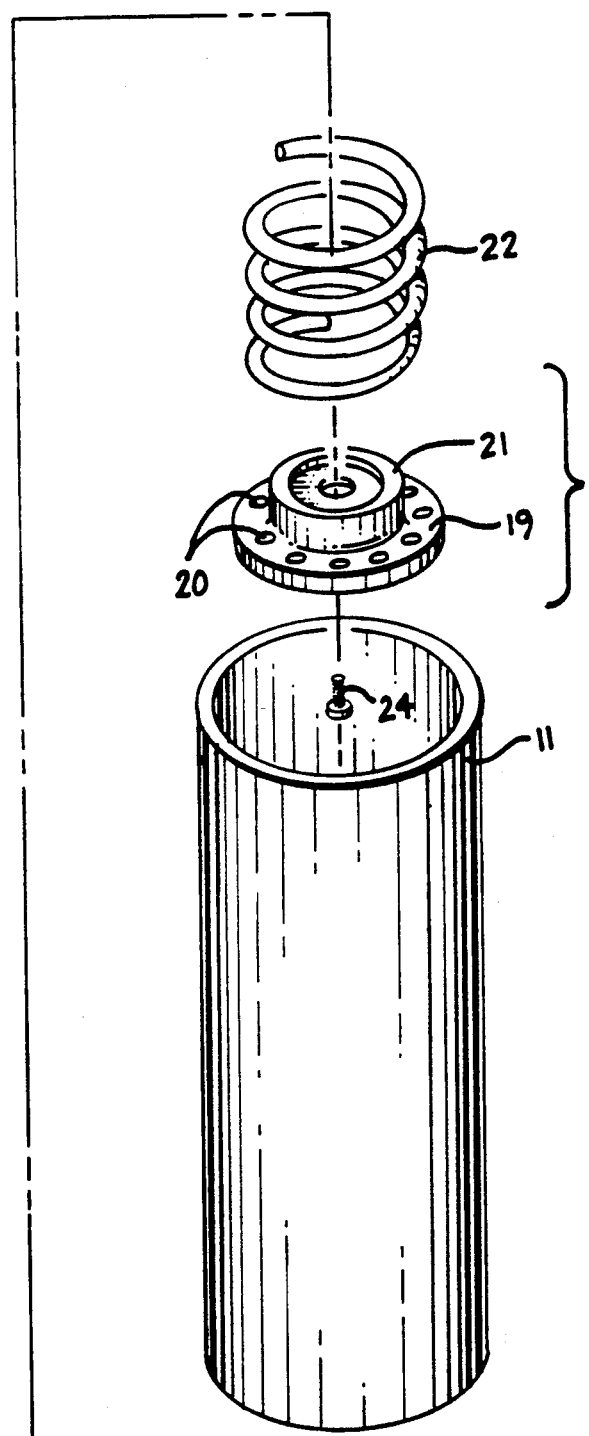
Fig 4

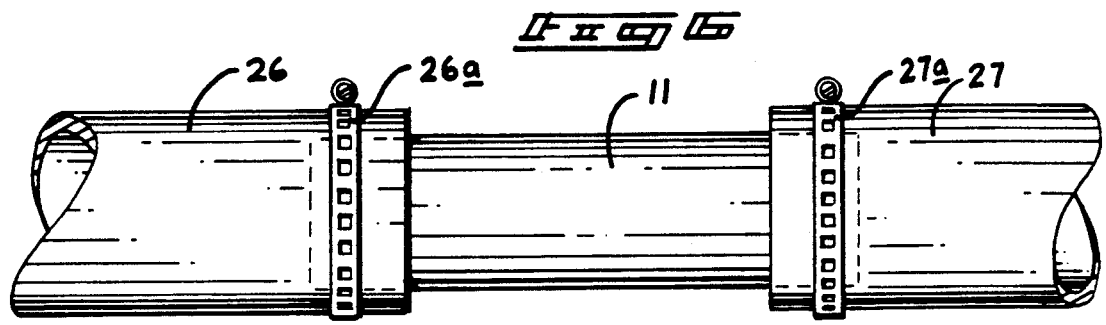
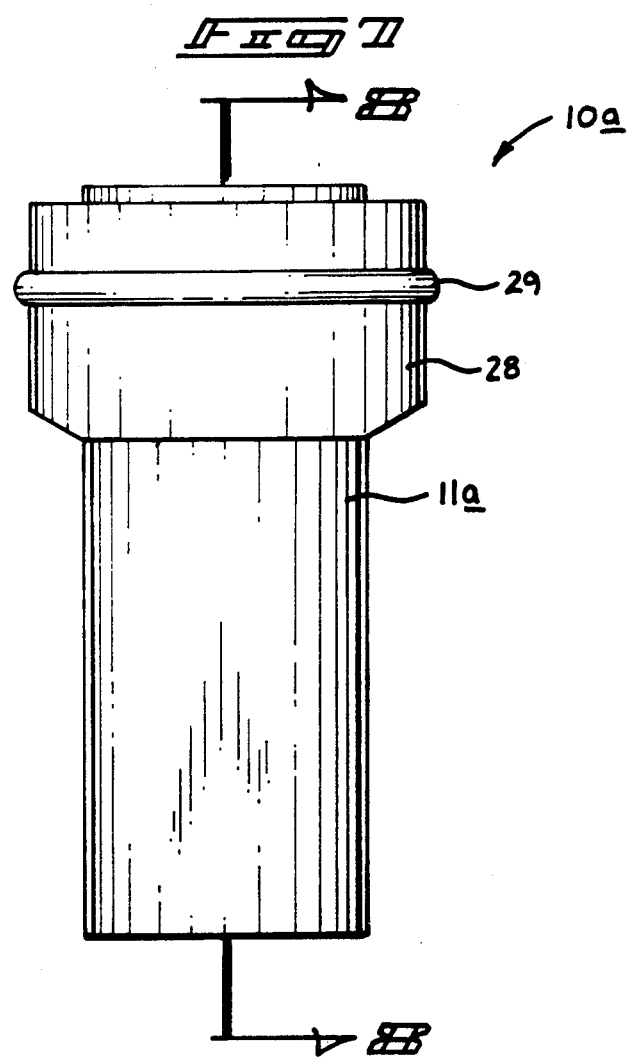

THERMOSTAT APPARATUS

BACKGROUND OF THE INVENTION

1. Field of the Invention

The field of invention relates to thermostat apparatus, and more particularly pertains to a new and improved thermostat apparatus wherein the same is arranged for convenience of mounting and replacement within fluid conduits, particularly within automotive enviroments.

2. Description of the Prior Art

The advent of thermostats to enhance initial warming of circulatory cooling fluid about a water-cooled engine includes drawbacks in servicing of such units. The instant invention attempts to overcome deficiencies of the prior art wherein a unitary thermostat unit may be readily retrofitted and serviced within existing circulatory fluid conduits. Examples of the prior art include U.S. Pat. No. 4,431,133 to Roberson, Sr. wherein a thermostat organization is mounted between the engine block and the radiator within a rigid, fluid conduit.

U.S. Pat. No. 4,359,972 to Calkins sets forth a thermostat valve mounted within a conduit mounted within a fuel system of an internal combustion engine.

U.S. Pat. No. 4,560,104 to Nagumo, et al. sets forth a thermostat organization mounted in a cooling passageway leading to a radiator of a generally rigid construction.

U.S. Pat. No. 4,537,346 to Duperz sets forth an oil-flow control apparatus of temperature sensitive construction utilizing a thermostat mounted within rigid conduit.

U.S. Pat. No. 4,434,750 to Edelmann sets forth a further example of a thermostat mounted within a rigid extension of an associated cooling system of an internal combustion engine.

As such, it may be appreciated that there continues to be a need for a new and improved thermostat apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of thermostat apparatus now present in the prior art, the present invention provides a thermostat apparatus wherein the same sets forth a unitary thermostat organization conveniently retrofitted to an existing flexible conduit of an associated cooling passageway of an internal combustion engine. As such, the general purpose of the present invention, which will be described subsequently in greater details, is to provide a new and improved thermostat apparatus which has all the advantages of the prior art thermostat apparatus and none of the disadvantages.

To attain this, the present invention provides an apparatus wherein a thermostat is mounted within a sleeve, with the sleeve positionable as a junction between a plurality of hoses, or alternatively, the sleeve formed with a sealing boss, with the sealing boss extending radially beyond the sleeve, and including an "O" ring to effect sealing of the organization within a single unitary fluid conducting hose.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved thermostat apparatus which has all the advantages of the prior art thermostat apparatus and none of the disadvantages.

It is another object of the present invention to provide a new and improved thermostat apparatus which may be easily and efficiently manufactured and marketed.

It is a further object of the present invention to provide a new and improved thermostat apparatus which is of a durable and reliable construction.

An even further object of the present invention is to provide a new and improved thermostat apparatus which is susceptible of a low cost of manufacture with regard to both materials and labor, and which accordingly is then susceptible of low prices of sale to the consuming public, thereby making such thermostat apparatus economically available to the buying public.

Still yet another object of the present invention is to provide a new and improved thermostat apparatus which provides in the apparatuses and methods of the prior art some of the advantages thereof, while simultaneously overcoming some of the disadvantages normally associated therewith.

Still another object of the present invention is to provide a new and improved thermostat apparatus wherein the same sets forth ease and convenience of retrofit mounting to an existing flexible conduit of a coolant system of a water-cooled internal combustion engine.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 4 is an isometric, exploded illustration of the thermostat apparatus of the instant invention.

FIG. 6 is an orthographic side view, taken in elevation, of the thermostat apparatus in assembled configuration utilizing clamps for the construction.

FIG. 7 is an orthographic side view, taken in elevation, of a modified thermostat apparatus of the instant invention.

DESCRIPTION OF THE PREFERRED EMBODIMENT

Figure 1:
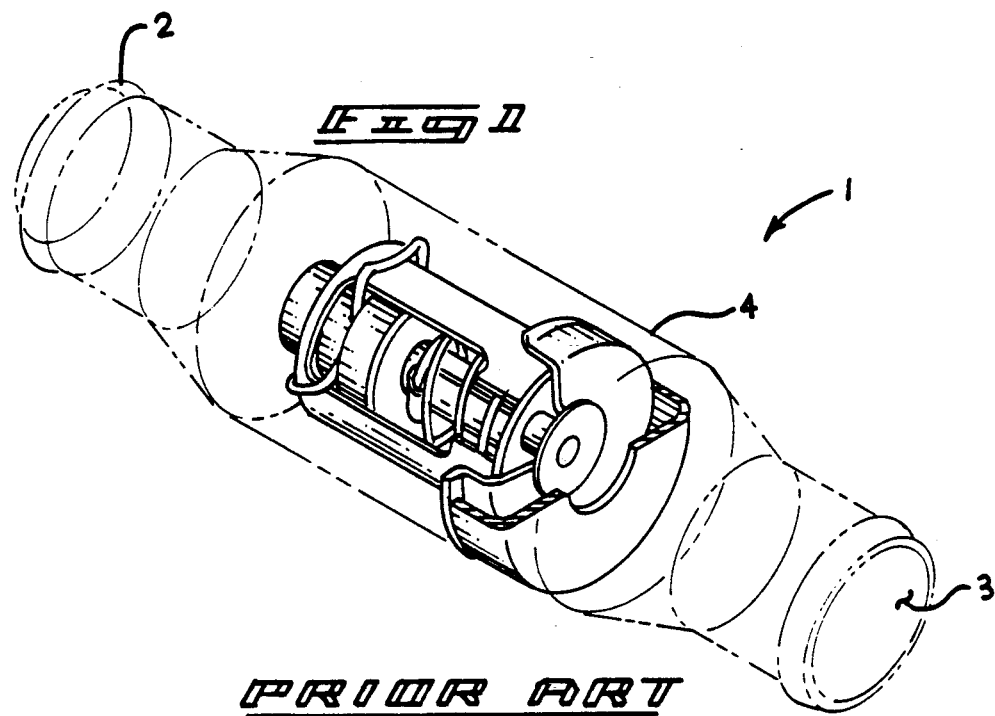
FIG. 1 is an isometric illustration of a prior art thermostat apparatus.
Figure 2:
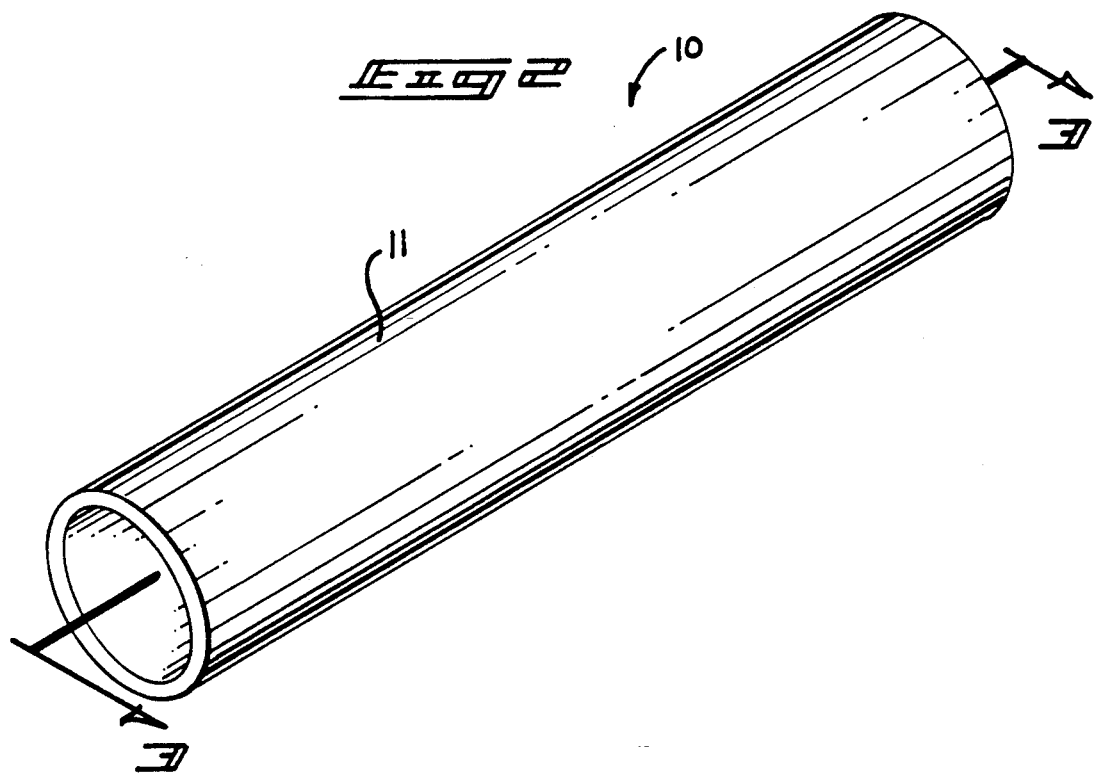
FIG. 2 is an isometric illustration of the thermostat cylindrical sleeve utilized by the instant invention.
Figure 3:
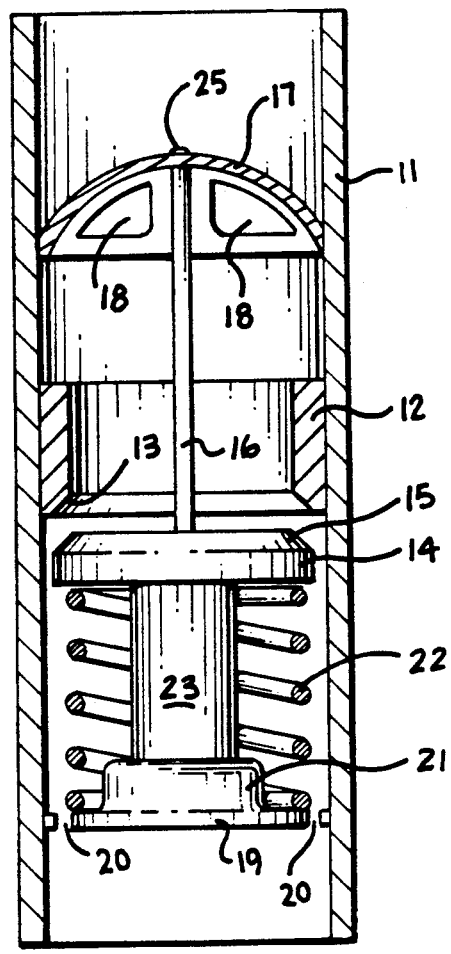
FIG. 3 is an orthographic cross-sectional illustration, taken along the lines 3—3 of FIG. 2 in the direction indicated by the arrows.

With reference now to the drawings, and in particular to FIGS. 1 to 9 thereof, a new improved thermostat apparatus embodying the principles and concepts of the present invention and generally designated by the reference numerals 10 and 10a will be described.

FIG. 1 is a prior art thermostat apparatus, as described in U.S. Pat. No. 3,459,972, and indicated by numeral 1, wherein a conduit 4 of rigid construction, including an inlet 2 and outlet 3, mounts a thermostat member therewithin for use in liquid propane fuel systems.

More specifically, the thermostat apparatus 10 of the instant invention essentially comprises a rigid, tubular sleeve 11, including a cylindrical thermostat housing 12 fixedly mounted within the sleeve 11 coaxially aligned therewithin. The thermostat housing 12 includes a conical seat 13 formed at a lower therminal end of the housing 12 and coaxially aligned therewith. The conical seat 13 complementarily receives a conical valve seat 15 formed at an upper terminal end of the cylindrical valve body 14. The head body 14 includes a head body bore 14a coaxially directed therethrough and slidably mounted about a guide rod 16 that is axially aligned relative to the thermostat housing 12 and sleeve 11 and fixedly mounted at its upper terminal end to a semispherical guide plate 17 that includes an array of guide plate windows 18 annularly arrayed about the cylindrical guide plate 17 coaxially thereof utilizing an upper fastener 25 to coaxially mounted the rod 16 interiorly of the guide plate 17. A mounting plate 19 is fixedly mounted to an interior surface of the housing 11 and includes an annular array of openings 20 annularly directed through the mounting plate 19. The mounting plate 19 including a mounting plate boss 21 integrally and coaxially aligned relative to the mounting plate and extending upwardly thereof, with a guide cylinder 23 coaxially aligned and positioned between the valve head body 14 and the mounting plate boss 21. A coil spring 22 is captured between a bottom surface of valve head body 14 and an upper surface of the mounting plate 19. The coil spring 22 is formed of conventional bi-metallic material to effect contraction of the coil spring that is mounted to a bottom surface of the head body 14 to retract the head body 14 relative to the conical seat 13 during passage of fluid at an elevated temperature through the openings 20. It is noted that a lower fastener 24 coaxially directed through the mounting plate 19 fixedly secures a lower terminal end of the guide rod 16 to the mounting plate 19 to effect coaxial alignment of the valve head body 14 and associated guide cylinder 23. The guide cylinder 23 further includes a guide cylinder bore 23a to permit reciprocation of the guide cylinder 23 and associated head body 14 along the guide rod 16.

Figure 5:
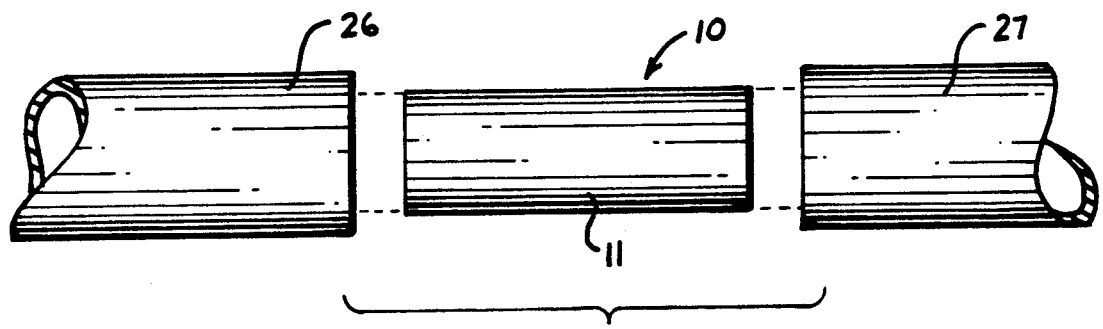
FIG. 5 is an orthographic side view of a thermostat apparatus retrofitted to a fluid conduit.

FIG. 5 illustrates the use of the apparatus 10 mounted within a flexible fluid conduit, wherein the fluid conduit is severed to form a respective first and second hose member 26 and 27 that are spaced with the tubular sleeve 11 mounted therebetween, utilizing a first hose member clamp 26a mounted about the first hose member, and a second hose member clamp 27a mounted about the second hose member to capture and secure the sleeve 11 between the first and second hose members as illustrated.

Figure 8:
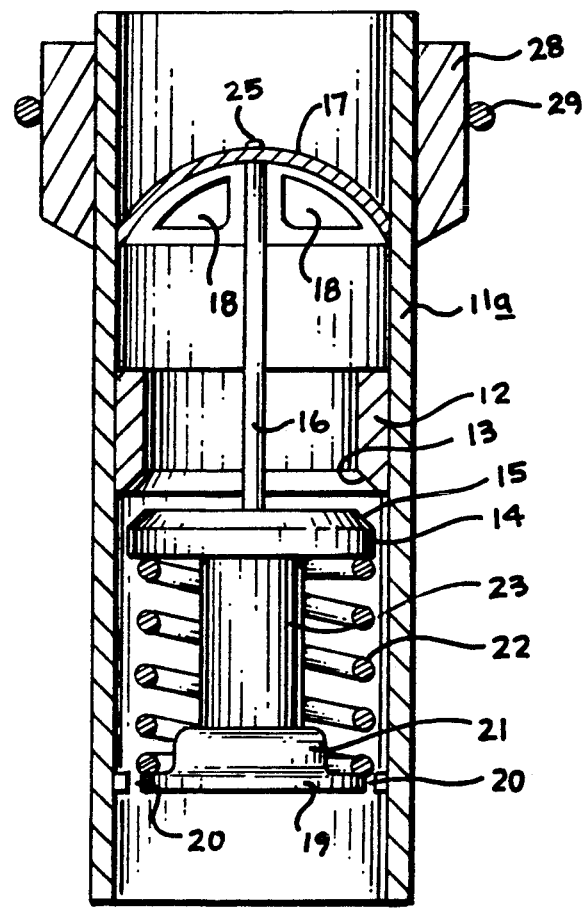
FIG. 8 is an orthographic view, taken along the lines 8—8 of FIG. 7 in the direction indicated by the arrows.
Figure 9:
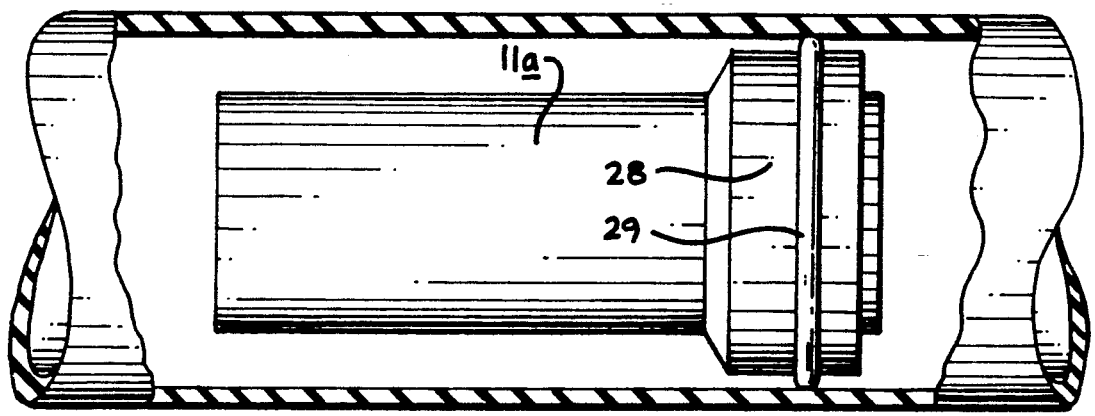
FIG. 9 is an orthographic side view, partially in section, of the modified thermostat apparatus as set forth in FIGS. 7 and 8 assembled within a flexible fluid conduit.

FIGS. 7-9 illustrate a modified thermostat apparatus 10a, wherein a modified tubular sleeve 11a mounts the thermostat apparatus, as described above, therewithin, but further includes a sealing, cylindrical boss 28 surroundingly and fixedly mounted coaxially of the sleeve 11a adjacent its upper terminal end. A polymeric "O" ring 29 circumferentially is mounted to the sealing cylindrical boss 28 and projects radially outwardly thereof, whereupon projection of the modified thermostat apparatus 10a within a unitary flexible fluid conveying hose 30 effects sealing of the apparatus 10a therewithin by virtue of the polymeric "O" ring 29 defining a predetermined diameter substantially equal to or less than an internal diameter defined by the fluid conveying hose 30.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A thermostat apparatus comprising, in combination,
   a tubular sleeve, the tubular sleeve including a cylindrical housing mounted therewith, the thermostat housing including a lower terminal end, with the lower terminal end defining a conical seat, and
   a cylindrical valve head body mounted underlying the conical seat, with the cylindrical valve head body including a conical valve seat, with the conical valve seat complementarily received within the conical seat, and
   a guide cylinder mounted underlying the valve head body, and
   a mounting plate fixedly mounted within the tubular sleeve coaxially aligned with the tubular sleeve and the cylindrical thermostat housing, and
   a guide rod fixedly mounted to the mounting plate and projecting coaxially upwardly thereof projecting through the thermostat housing, and the guide rod including an upper terminal end, and the upper terminal end of the guide rod coaxially mounted interiorly of a semi-spherical guide plate, the guide plate including an annularly arranged array of guide plate windows, and
   the valve head body including a valve head body bore coaxially directed through the valve head body, with guide rod slidingly directed through the valve head body bore, and
   the guide cylinder including a guide cylinder bore, with the guide cylinder bore slidingly receiving a guide rod therethrough, and
   a bi-metallic coil spring mounted between the mounting plate and a bottom surface of the head body to withdraw the conical valve seat from the conical seat of the thermostat housing upon heated fluid being directed through the tubular sleeve.

2. An apparatus as set forth in claim 1 wherein the guide plate includes a plurality of openings annularly formed about the mounting plate to direct fluid therethrough.

3. An apparatus as set forth in claim 2 wherein the mounting plate includes a mounting plate boss and the guide rod fixedly mounted coaxially of the mounting plate boss, and the mounting plate boss includes a cylindrical recess to complementarily receive the guide cylinder complementarily therewithin to align the guide cylinder relative to the mounting plate to prevent misalignment of the guide cylinder relative to the coil spring.

4. An apparatus as set forth in claim 3 wherein the guide plate is formed of a semi-spherical configuration defining a concave surface overlying the thermostat housing.

5. An apparatus as set forth in claim 4 wherein the tubular sleeve includes a sealing, cylindrical boss surroundingly and fixedly mounted coaxially of the tubular sleeve adjacent an upper terminal end of the tubular sleeve.

6. An apparatus as set forth in claim 5 wherein the sealing, cylindrical boss includes a polymeric "O" ring circumferentially mounted about the sealing cylindrical boss, and the "O" ring defining an "O" ring diameter, and the tubular sleeve and sealing cylindrical boss positioned within a unitary flexible fluid conveying hose defined by an internal hose diameter, wherein the internal hose diameter is substantially equal to or less than the "O" ring diameter to effect a compression sealing of the "O" ring within the hose.

* * * * *